United States Patent [19]

Lu

[11] Patent Number: 4,679,654

[45] Date of Patent: Jul. 14, 1987

[54] DESCENDING LIFE-ESCAPING DEVICE SPECIALLY FOR A HIGH BUILDING USE

[76] Inventor: Li-Hsing Lu, 7, Ping-Taan Road, Ta-Cherng Hsiang, Changhua Hsien, Taiwan

[21] Appl. No.: 828,507

[22] Filed: Feb. 12, 1986

[51] Int. Cl.[4] .................................................. B60T 3/00

[52] U.S. Cl. ........................................ 182/5; 182/191; 182/6

[58] Field of Search ........................ 182/5, 3, 6, 7, 191; 188/65.4, 65.1

[56] References Cited

U.S. PATENT DOCUMENTS

| | | | |
|---|---|---|---|
| 1,087,440 | 2/1914 | Freed | 188/65.5 |
| 4,515,240 | 5/1985 | Curtis | 182/6 |

FOREIGN PATENT DOCUMENTS

| | | | |
|---|---|---|---|
| 327005 | 12/1902 | France | 188/65.1 |
| 375210 | 6/1932 | United Kingdom | 182/5 |
| 1048303 | 11/1966 | United Kingdom | 182/5 |

*Primary Examiner*—Ramon S. Britts
*Assistant Examiner*—Karen J. Chotkowski
*Attorney, Agent, or Firm*—Browdy and Neimark

[57] ABSTRACT

A descending life-escaping device for a high-building use, particularly comprising a weight-supporting member as well as a steel cable with its top end firmly fixed somehow on the building and vertically hanged down along the wall thereof, is adapted to enable a person in life-threatening situation to descend from an elevated place safely by holding said weight-supporting member which is removably attached to said cable and guides said cable in a simply winding manner by means of a number of accordingly positioned coil-like parts through which said cable is led so that coil-like parts can produce tremendous frictional force against said cable so to reduce the descending speed of the user to a safe extent.

5 Claims, 4 Drawing Figures

FIG. 1-A

DESCENDING LIFE-ESCAPING DEVICE SPECIALLY FOR A HIGH BUILDING USE

SUMMARY OF THE INVENTION

The present disclosure relates to a life-escaping device which enables a person to descend from an elevated place to ground in a life-jepardizing situation by using a specially-designed weight-supporting member having a number of coil-like parts planted thereon, through which is guided a steel cable having its top end firmly fixed somehow, and the coil-like parts are disposed in such a manner that said steel cable can be disposed in a simply winding way, in which the weight of the descending person can be partially balanced from the frictional contacts between said cable and coil-like parts. Holding said weight-supporting member by its grip handles disposed symmetrically on both sides, enables a person escaping from danger to descend from an elevated place to ground safely following through said vertically hanged steel cable.

Because of the scarcity of available land in populated cities, most of the buildings have been constructed in a highly erected manner so that inhabitants in the cities can have larger living space. A serious problem associated with those highly-constructed buildings is how to evacuate people in life-threatening situations. According to statistics, most lifes lost in a high-building fire are attributed to accidental escapes.

Not every building has been equipped with effective life-escaping facilities, and people using emergency routes to escape often find themselves trapped in fire or smoke; besides, most of the public life-escaping devices adapted worldwide must be preset in advance outside the building, and those fixed equipments like tracks are either expensive or destructive to the appearance of the buildings. Moreover, in case the life-escaping facilities are under the influence of fire, people escaping can not use the facilities at all.

The major object of the present disclosure is to provide a practical descending life-escaping device which can enable a person to descend from a high building or an elevated place safely, and said life-escaping device is simply structured and is suitably installed in an individual compartment in a public-shared building for the best effect.

The further object of the present disclosure is to provide a descending life-escaping device which is simply structured, compact in size, and can be attached to a cable readily in an emergency, and be packed with ease when not used.

The further object of the present disclosure is to provide a decending life-escaping device especially for high building use in an emergency, which is detached from the steel cable when not used, and can be readily attached thereto for escaping purpose, and a number of the like devices can be attached to said steel cable at one time for a number of people to use at the same time, if the end of said cable is fixed firmly and securely enough at position.

The further object of the present disclosure is to provide a descending life-escaping device not fixedly positioned at a particular position, but can be carried along readily, and selectively installed and hanged at a safe spot for securely effecting an escaping purpose.

Hereinafter, the use of the subject matter is better demonstrated by a number accompanying drawings wherein:

DESCRIPTION OF DRAWING

FIG. 1-A is a diagram showing the hook attaching member having an inner threaded end for receiving the extended end of the coil-like part;

DETAILED DESCRIPTION

Figure 1:
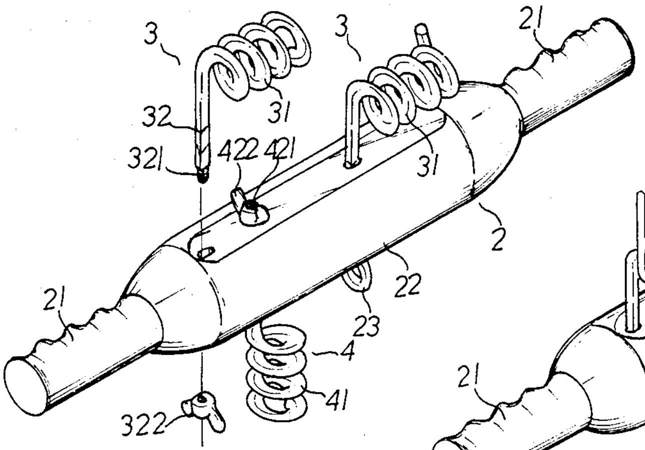
FIG. 1 is a partially analytic diagram of the weight-supporting member consisting of a number of coil-like parts.
Figure 2:
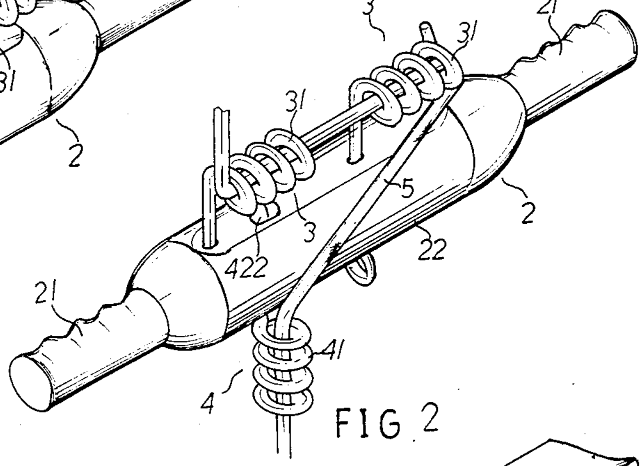
FIG. 2 is a diagram showing said steel cable windingly guided through said coil-like parts.

Referring to FIG. 1 and FIG. 2, the subject matter mainly is a transversely-disposed sausage-shaped weight-supporting member 2 having grip handles 21 positioned on both sides thereof respectively, and two coil-like parts 3 horizontally and symmetrically planted on the top side thereof; and another coil-like part 4 is vertically planted to the left of the middle of the bottom side, through which is windingly disposed the steel cable 5. All said coil-like parts 3 and 4 are made up of a plurality of spirally-proceeding rings 31 and 41 of elastic steel material and secured to said weight-supporting member 2 by means of a number of butterfly nuts which engage with elongated threaded end of said coil-like parts 31, 41.

The coil-like parts 3, 4 are characterized in that the distance between each serially-proceeding rings 31 or 41 is kept large enough so that the steel cable 5 can be disposed therein by guiding the transversely positioned steel cable through the spirally-proceeding rings one by one in a spiral manner from the open end, and then the coil-like parts 3, 4 are removably secured to said weight-supporting member 2 by placing the elongated threaded ends of said coil-like parts 3, 4 through two holes thereon respectively using butterfly nuts 322, 422 to firmly fix thereto.

When in use, the user must first firmly fixed the top end of said steel cable to a particular spot firmly enough to support the weight of the hanging object, and then let drop the cable, and the cable, guided through those said coil-like parts 3, 4 in a simply winding way in which the cable is made in frictional contact with said coil-like parts 3, 4 as well as the front side of said weight-supporting member 2, so that the gravitational force of the descending person can be cut down in great amount as a result of frictional force, therefore the descending speed is accordingly reduced to a safe extent. The body of said weight-supporting member 2 is constructed in a sausage shape for either to maximize the contact area between said cable and said weight-supporting member 2 or minimize the damage of the member 2 to cable 5. To the bottom of said weight supporting member 2 is secured a hook-attaching member 23.

Figure 3:
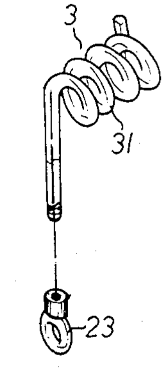
FIG. 3 is a practical application of the present disclosure in an emergency, enabling a person to descend from a high building or an elevated place.
Figure 3:
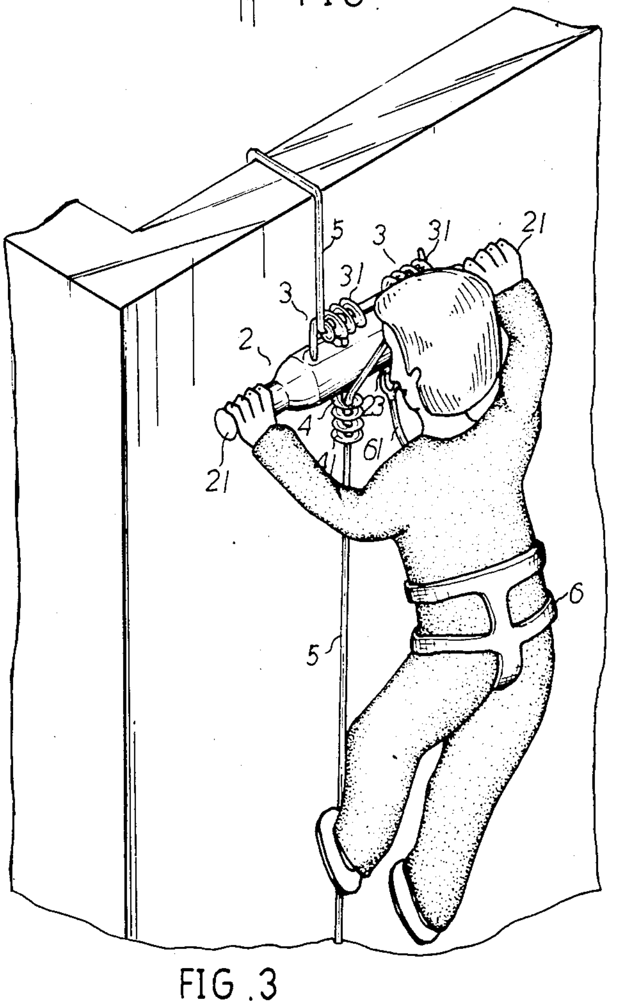

Referring to FIG. 3 in which a practical application of said life-escaping device is demonstrated. The person wearing a body hanging strap 6 having a belt 61 with a hook to disattachably connect to said hook 23 is well adjustably balanced of its gravity center by firmly holding grip handle 21 on both sides; the friction between said cable 5 and those spirally-proceeding rings of said coil-like parts 31, 41 can slow down the descending speed.

With the feet of the descending person pushing against the wall of the building said person is further protected from dropping too fast.

Having thus disclosed the best embodiment of the invention presently contemplated, it is to be understood that various changes and modifications may be made by those skilled in the art without departing from the spirit of the invention.

What is claimed is:

1. A descending life-escape device for enabling a person to escape from a life-threatening situation from a high place mainly having a sausage-shaped and transversely-disposed weight-supporting member which is equipped with two grip handles on right and left sides thereof, a pair of transversely positioned coil-like parts on a top side of said weight-supporting member, and a vertically placed coil-like part on a bottom side of said weight supporting member, wherein said coil-like parts each include a spiral through which a vertically-hung cable to be descended by the person is wound from an open end of each spiral, said coil-like parts being provided on said weight-supporting member so that said cable passes through said device in a winding manner and frictionally contacts with all of said coil-like parts and a front side of said weight-supporting member, so that the descending speed of a person can be reduced by control of the descending person to bring said person to ground safely.

2. A descending life-escape device as claimed in claim 1, wherein a hook-attaching member is positioned in the middle of the bottom side of said weight-supporting member, and a body hanging-strap is hooked to said weight-supporting member for balance during descent of the person.

3. A descending life-escape device as claimed in claim 1, wherein said coil-like parts are provided with elongated threaded ends and are removably attached to said weight-supporting member through holes therein by means of respective butterfly nuts engaged with said elongated threaded ends.

4. A descending life-escape device as claimed in claim 1, wherein said sausage-shaped weight-supporting member is smoothly structured to provide maximum frictional area between said cable and the front side of said weight-supporting member and minimum damage to said cable during said descent.

5. A descending life-escape device as in claim 1, wherein said cable from an upper end passes in series from left to right through said two coil-like parts on the top side of said weight-supporting member and thence down and to the left to pass through said coil-like part on the bottom of said weight-supporting member, said coil-like part on the bottom side of said weight-supporting member being located under the left-most one of said coil-like members on the top side of said weight-supporting member.

* * * * *